United States Patent [19]

Benn et al.

[11] Patent Number: 4,906,776

[45] Date of Patent: Mar. 6, 1990

[54] CATALYSTS AND THEIR USE IN THE HYDROLYSIS OF NITRILES

[75] Inventors: Gerald P. Benn; David Farrar; Seraj A. M. Karolia, all of West Yorkshire, England

[73] Assignee: Allied Colloids Ltd., Great Britain

[21] Appl. No.: 52,030

[22] Filed: May 19, 1987

[30] Foreign Application Priority Data

| May 21, 1986 [GB] | United Kingdom | 8612345 |
| Jul. 11, 1986 [GB] | United Kingdom | 8616927 |
| Sep. 22, 1986 [GB] | United Kingdom | 8622795 |
| Mar. 12, 1987 [GB] | United Kingdom | 8705860 |

[51] Int. Cl.$^4$ .......................................... C07C 102/05
[52] U.S. Cl. ...................................... 564/127; 564/128
[58] Field of Search ............................... 564/127, 128

[56] References Cited

U.S. PATENT DOCUMENTS

| 3,597,481 | 8/1971 | Tefertiller et al. | 260/561 |
| 3,631,104 | 12/1971 | Habermann et al. | 260/561 N |
| 3,696,152 | 10/1972 | Habermann et al. | 260/561 N |
| 4,056,565 | 11/1977 | Matsuda | 564/127 |
| 4,096,184 | 6/1978 | Nakamura | 260/561 N |
| 4,176,137 | 11/1979 | Platz et al. | 502/234 |
| 4,178,310 | 12/1979 | Fetchin et al. | 564/127 |
| 4,593,123 | 6/1986 | Matsuda | 564/127 |

FOREIGN PATENT DOCUMENTS

| 145553 | 6/1985 | European Pat. Off. |
| 59-18383 | 8/1977 | Japan |
| 1347160 | 2/1974 | United Kingdom |
| 1040532 | 9/1975 | United Kingdom |
| 1459685 | 12/1976 | United Kingdom |
| 86/00614 | 1/1986 | World Int. Prop. O. |

OTHER PUBLICATIONS

Khim Tekhnol (Kiev) 1985, 6, pp. 22–23 (translation only).

*Primary Examiner*—Robert V. Hines
*Attorney, Agent, or Firm*—Ostrolenk, Faber, Gerb & Soffen

[57] ABSTRACT

When making an a amide by hydrolysis of a nitrile in an aqueous medium containing a Raney copper catalyst, the yield of amide can be increased and the yield of impurities can be decreased by including vanadium metal in the catalyst. The vanadium may be present as Raney vanadium often as an alloy in the Raney copper.

13 Claims, No Drawings

CATALYSTS AND THEIR USE IN THE HYDROLYSIS OF NITRILES

It is known to make amides by hydrolysis of the corresponding nitrile in an aqueous medium containing a solid catalyst. The process is of particular value in the manufacture of acrylamide from acrylonitrile.

A wide variety of catalysts have been proposed, including catalysts based primarily can a single metal or metal compound and catalysts based on blends of metals or metal compounds. Examples include the disclosures in GB 1,347,160 and 1,459,685 and U.S. Pat. No. 3,597,481, 3,631,104 and 4,056,565.

Although many of the catalysts are based on Raney copper, there are numerous proposals for making a solid copper catalyst by decomposition of another copper compound which may be solid, for instance copper oxide, or in solution, for instance a soluble copper salt or a soluble complex of a copper compound. Many of these processes recommend including metal compounds with the copper compound during the preparation of the solid catalyst.

In U.S. Pat. No. 3,696,152, the catalyst is a reduced mixture of copper oxide and a metal oxide, generally made by coprecipitation of a mixture of copper and other metal salts followed by decomposition of the mixed coprecipitate. More than 40 metals are mentioned, selected from groups 2A, 3A, 4A, 2B, 3B, 4B, 5B, 6B, 7B and 8B, but it is stated that the metals that are preferred, as they are the most effective, include metals such as chromium, manganese, iron, cobalt and nickel. Vanadium is included in the very long list of named metals, but is not exemplified. In the examples the amount of the metal is relatively large (for instance 0.15 mole metal nitrate is used with 0.85 mole copper nitrate). The reducing conditions by which the copper oxide is reduced to black copper will be inadequate for reducing most of the described metals to their metallic state and they will, instead, remain in the form of an oxide. For instance, vanadium would be present with the black copper in the form of vanadium oxide.

Similar long lists of possible additional compounds are given in GB 1,404,532 (in which copper hydride is decomposed) and GB 1,417,026 (where a copper compound is reduced with formaldehyde).

In Japanese patent 59-18383, copper formate and a pyridine compound are decomposed in a solvent containing a compound of vanadium or chromium or niobium or tantalum.

Several publications propose the incorporation of a vanadate compound during the preparation of the copper catalyst. Such processes are published in, for instance, GB 1,562,323, BR 8305831, EP 145553, U.S. 4,096,184 and Japanese patent 56-20308. There is some evidence, e.g., in JP 56-20308, that the inclusion of the vanadate gives a small increase in the activity of the catalyst. Catalysts formed with a vanadate are examined, in particular, in Khim Tekhnol (Kiev) 1985, 6, 22-3 and Chemical Abstracts Volume 104 No.130293Z in which it is stated that repeated use of the catalyst showed little reduction in activity over ten trials after which it began to fall sharply, and that the operating life of the finely dispersed catalysts is very short.

For these or other reasons, the fact is that catalysts containing vanadates and other compounds of transition metals have not been reported as having achieved significant commercial success as catalysts for the hydrolysis of nitriles.

The most significant commercial processes are those in which the catalyst is a black copper catalyst. Of these, Raney copper has been widely reported but others include Ullmann copper or reduced copper oxide.

Many of the disclosures of copper catalysts in the literature are concerned with maximising the conversion of nitrile to amide. Conversion tends to be increased by increasing the temperature of reaction. This is why it is normal in commercial practice to perform the reaction at above 100° C. under pressure, even though some patents suggest that lower temperatures are satisfactory. Unfortunately increased conversion of acrylonitrile is generally accompanied by increased formation of undesirable by-products such as ethylene cyanohydrin.

In GB 1,347,160, conversion is improved by including a promotor, but by-product formation can still be a problem. In WO86/00614, a process is described using a black, generally Raney, copper catalyst in a reaction medium which has dissolved in it both an oxidising agent, generally copper nitrate, and a reagent that will reduce by-product formation without significantly reducing conversion, generally acetic acid.

Increased conversion would be very desirable as it would allow an increased rate of production using the same apparatus and/or energy input and/or catalyst amount, or it would allow an equivalent rate of production using a smaller apparatus and/or lower energy input and/or lower catalyst amount. Reduced by-product formation would be desirable as it would eliminate or reduce the need for purification procedures. Attainment of these objectives using copper catalyst technology of the same type as is already in use, and in particular Raney copper technology, would be desirable as it would permit maximum utilisation of existing capital equipment and know-how.

It would therefore be desirable to be able to modify a black copper catalyst, especially a Raney copper catalyst, system so as to improve the conversion and/or to reduce the by-product formation and/or to permit good conversion at much lower temperatures than have previously been commercially satisfactory, and in particular under atmospheric pressure. In particular it would be desirable to be able to modify a Raney copper catalyst system so as simultaneously to improve the conversion (or permit a lower reaction temperature) and reduce the by-product formation.

In the invention, an amide of the formula RCONH2 where R is a hydrocarbon group of 1 to 10 carbon atoms is made by hydrolysis of the corresponding nitrile RCN in an aqueous medium containing a metal catalyst comprising black copper metal, and in this process the metal catalyst also contains vanadium metal in an amount of about 0.01 to 10% by weight based on the combined weight of copper and vanadium.

A catalyst according to the invention comprises about 90 to 99.99% black copper and about 0.01 to 10% vanadium metal, the percentages being based on the combined weight of copper and vanadium.

The black copper may be a true black colour or merely a very dark colour, for instance dark purple, but it must not be pink, red or salmon coloured. The dark or black colour appears to indicate that the catalyst is a metallic copper carrying a partially oxidised or ionic surface layer. Best results, and the greatest improvement, occurs when the copper is Raney copper. However some improvement may also occur when the copper is Ullman copper or when it is reduced copper oxide or when it is other forms of black copper.

The vanadium must be in the form of vanadium metal, either substantially pure metal or a metal alloy. The use of compounds of vanadium does not give the advantages of the invention and thus, for instance, the use of vanadium oxide or copper vanadate does not give the advantages of the invention. It appears that the vanadium remains in its metallic form throughout the process and that substantially no vanadium is taken into solution during the process. The incorporation of dissolved vanadium compounds into the hydrolysis medium during the process does not give the benefits obtainable from the use of solid metallic pure or alloy vanadium.

The vanadium is generally present in the catalyst as metallic vanadium alone (e.g., of conventional commercial purity) or as an alloy of vanadium with at least one other metal that does not deleteriously interfere in the process. A suitable alloying metal is copper of the black copper metal catalyst and so the catalyst may consist of an alloy of black copper metal with vanadium or may comprise a blend of black copper metal and an alloy of black copper metal with vanadium. Alternatively, the catalyst may be a physical blend of black copper particles with vanadium particles.

The black copper is preferably Raney copper. The vanadium is preferably also in a Raney form, either as a component in a Raney alloy of copper and vanadium or as Raney vanadium itself.

The alloy of copper and vanadium, or each component of a physical mixture of copper and vanadium, should have a very high surface area. This high surface area may be provided by incorporating the alloy or the individual components in the form of sheet, foil or filament of very large surface area, relative to the volume of the aqueous medium, but preferably is provided by including the alloy or the components in particulate form having a high surface area. The particles may have a microporous structure, preferably being Raney particles, and/or may have a very small size. Generally the particles of alloy or of the individual components are below 1 mm and usually below about 500μm in size and are preferably below about 300μm. Best results are generally obtained when they are below about 200 or 150μm. When the particles, are Raney particles they are usually above about 10μm, often above about 50μm. When they are not microporous, very fine particles, e.g., below 50 and usually below 10μm, are often preferred.

The particles may be bonded into porous aggregates, for instance in the form of flow particles as described in EP 0202780. Such aggregates preferably include both the copper and the vanadium. Part or all of the catalyst may be carried on an inert support material, e.g., as mentioned in GB 1,459,685, but generally the entire system is unsupported. Conveniently the particulate catalyst is provided as a slurry in, e.g., water.

One preferred catalyst system is a Raney alloy catalyst wherein the alloy metals are the mixture of copper and vanadium. Thus an alloy of copper, vanadium and leachable metal may be formed, e.g., by melt mixing, and may then be subjected to the normal procedures for converting an alloy into a particulate Raney catalyst, each particle thus being a Raney particle containing both copper and vanadium.

Another preferred catalyst system according to the invention comprises a physical mixture of particulate Raney copper with particulate Raney vanadium.

Another preferred catalyst system according to the invention comprises an intimate mixture of particulate Raney copper with particulate metallic vanadium, for instance made by blending conventional, non-porous, particulate vanadium with particulate Raney copper.

The catalyst consists essentially of the copper and vanadium metals but additional metals may be included in the catalyst system provided they do not detract from the advantages of including vanadium and they may be in the copper, the vanadium or the copper vanadium alloy as alloy, or they may be present as separate metal particles. In particular, Raney copper catalyst may include small amounts of leachable metal remaining from the manufacture of Raney copper or other Raney metals in the catalyst system. This leachable metal is generally aluminium but other suitable metals include zinc and magnesium. Its amount is preferably zero, or as close to zero as possible, but satisfactory results can be obtained with larger amounts, for instance up to 5% if the additional metals are active in the catalytic process or even higher, e.g., up to about 20% or more, based on the total weight of metal in the catalyst if the metals are merely diluents. Metal compounds, that may be soluble or insoluble, may also be included.

We find that results vary considerably according to the amount of vanadium metal in the catalyst and that if too much vanadium is present the results deteriorate.

In order to obtain a significant improvement, it is generally desirable for there to be at least 0.1% vanadium and usually at least about 0.3% and best results are generally obtained with at least about 0.5% vanadium. However more than 10% vanadium is usually undesirable and for best results the amount is generally below about 7%, typically below about 5%. The preferred particulate catalyst therefore contains about 95 to 99.5% Raney copper and about 0.5 to 5% vanadium.

When the vanadium is present as Raney vanadium or, especially as a Raney copper-vanadium alloy, best results are often obtained when the amount of vanadium is below about 2%, typically about 1%, but usually above about 0.3 or 0.5%. However in other instances, when the vanadium is not microporous, best results are obtained at these or higher values, for instance values of around 3 to 7%, typically about 5 or 6%, are sometimes best when the catalyst is a blend of Raney copper and metallic vanadium.

The prior art discussed above shows that the known incorporation of vanadium compounds into various copper catalysts gives only limited advantages. Also these proposals are inappropriate for improvement in a process that has been designed, and the plant constructed, to operate using a particular form of black copper catalyst, namely Raney copper. However the use of metallic vanadium in the invention gives remarkable improvements in a Raney copper catalyst processes, both in terms of yield and purity. Thus whereas conventional efforts at improving yield have tended to reduce purity, and vice versa, by the invention it is possible to obtain a simultaneous dramatic improvement both in yield and in purity compared to known processes using Raney copper.

The advantages of the invention can be utilised in various ways of improving the hydrolysis process compared to the conventional process using Raney or other black copper.

The reaction temperature can be reduced without decreasing the yield obtained using the corresponding black catalyst free of vanadium. Often the reaction temperature can be reduced by at least 5° C. and often 10 to 40° C. compared to the optimum for the standard catalyst but without any substantial reduction in conversion. Even at significantly reduced reaction temperature, the conversion is often substantially complete or is, in any event, better than the conversion obtainable with the standard catalyst at higher temperature. Although the literature has suggested that reaction temperatures can be below 100° C., in commercial practice they always had to be at least 120° C. and the reaction had to be conducted under pressure and as a continuous or semi-continuous process, if satisfactory yields were to be obtained. In the invention very good yields can be obtained at, e.g., 80° C. The process can be operated as a batch process and can be conducted at atmospheric pressure. Accordingly, for the first time it is possible to perform the process commercially to give good yield without the need for a pressurised reaction vessel.

The amount of catalyst system that is required can be substantially reduced, for instance by at least 5% and typically 10 to 50% or even more based on the weight of black copper catalyst that is normally required. Thus in the commercial hydrolysis of acrylontrile to acrylamide it is known to be necessary to replenish the Raney copper catalyst during a prolonged process lasting several days or weeks, and the amount that has to be present initially, and/or the amount that has to be replenished, can be greatly reduced in the invention compared to processes using the standard catalyst without reducing yield.

The by-product formation in the invention can be much less than when using the standard black copper catalyst for two reasons. First, at a given reaction temperature, there is less by-product formation. Second by-product formation tends to decrease with decreasing reaction temperature, and so the lower temperatures permitted by the invention contribute to reduction in by-production formation.

The size of the apparatus required to give a particular yield of amide can, in the invention, be substantially less than is required when using the conventional black copper catalyst and so the invention permits either a greatly increased yield from apparatus of unchanged size or an equivalent yield from much smaller apparatus, or both. The permissible reduction in size of the apparatus follows from the ability to reduce the amount of catalyst or to increase yield from the same amount of catalyst.

Thus a typical process of the invention using Raney copper with vanadium operates at a lower temperature and uses less catalyst but gives less impurities and a higher yield of the desired product, compared to the corresponding process without the vanadium metal.

The Raney or other black copper can be of inferior quality compared to that normally required for satisfactory production. For instance, after prolonged residence in the reactor the catalyst is usually rejected as being deactivated (for instance it may have only 5 to 20% of its initial activity). In the invention, this deactivated catalyst can be mixed with particulate vanadium and reused and will then give satisfactory yields. There is evidence that merely leaving partially deactivated Raney or other black copper and vanadium particles mixed together in a liquid phase for a few hours or days will tend to reactivate the mix to its original level of activity.

These advantages are shown mainly when the copper is Raney copper and are not shown with significantly larger amounts of metallic vanadium nor are they are shown with vanadium compounds or with any other metals that we have tested for use with black copper.

The use of manganese, molybdenum or titanium, in place of the vanadium, can give some improvement compared to the use of black copper alone but in some instances makes no difference or makes the results worse. The use of all the other metals that we have tested makes no difference or makes the results worse. For instance, we have tested metals such as those specifically preferred and exemplified in U.S. 3,696,152 and have found no significant benefit. Thus in addition to manganese, we have found that nickel and iron make the catalyst slightly worse and cobalt and chromium make it significantly worse. Similarly, the use of copper vanadate (that is formed during the preparation of the catalyst as in the prior art) gives greatly inferior results compared to those obtainable in the invention.

When the vanadium is to be in the form of a physical particulate mixture with the copper, the copper can be made by any of the ways that are known for making black copper catalysts and the resultant particulate black copper can be blended with the particulate vanadium. Preferably the copper, and preferably also the vanadium, is in the form of a Raney metal.

Raney catalyst particles can be made in a generally conventional manner by dissolving an alkali-soluble metal from an alloy of the alkali-soluble metal and the catalytic metal or blend of metals. The alkali-soluble metal is generally aluminium but can be other metals such as magnesium or zinc. The amount of alkali-soluble metal is generally from 0.3 to 3, most preferably around 0.7 to 1.5, parts by weight per part by weight of the catalytic, metal or blend of metals. The alkali is generally sodium hydroxide. The alkali-soluble metal is generally dissolved from the alloy by adding particulate alloy to aqueous alkali (typically 10 to 35% aqueous sodium hydroxide) whilst maintaining the temperature at below 70° C., typically 35 to 60° C., followed by aging to ensure substantially complete removal of the alkali-soluble metal, followed by rinsing with water to a substantially constant pH.

When the catalytic metal is copper alone, this is the conventional process for the production of Raney copper. When the catalytic metal is an alloy of copper and vanadium, the product is a Raney copper-vanadium catalyst of the invention. When a mixture of Raney copper and Raney vanadium is required it can be made by making the Raney copper and Raney vanadium separately by this technique and then blending, but preferably the mixture is made by performing the described process on a mixture of particles of an alloy of copper and soluble metal with particles of an alloy of vanadium and soluble metal.

When the catalyst is made by blending black (often Raney) copper with particulate metallic vanadium or with Raney vanadium, mere admixture of the particulate components is generally sufficient but prolonged tumbling, for instance for at least 4 hours, typically 6 to 24 hours, may sometimes be desirable. The mixing may be performed while the particles are in an aqueous medium.

In the starting nitrile RCN, and in the final amide $RCONH_2$, the group R is preferably an olefinic group having 2 to 10, preferably 2 to 4, carbon atoms, and the invention is of most value applied to the production of acrylamide or methacrylamide from acrylonitrile or methacrylonitrile. However R can be a saturated aliphatic group, e.g., alkyl of 1 to 10, often 1 to 4, carbon atoms, e.g., methyl. R can also be aryl, alkaryl or aralkyl in which the aryl group is usually phenyl and any alkyl group is usually $C_{1-4}$ alkyl. For instance the process can be used to hydrolyse acetonitrile or benzonitrile or any other nitriles that can be hydrolysed using Raney or other black copper catalyst.

The reaction temperature is preferably between 20° C. and 150° C., most preferably 60 to 120° C., or 130° C. with best results generally being obtained at above about 70 or 75° C. Temperatures up to about 95 or 100° C. are sometimes preferred, but very effective results are often obtained at 100 to 115° C. The reaction can be conducted under pressure, but the high conversions available in the invention at low temperatures mean that the process can also be conducted satisfactorily at atmospheric pressure.

The entire catalyst system required for the process may be provided as an aqueous slurry and may all be charged to the hydrolysis reaction mixture at start up for a short process, but for a prolonged (e.g., more than seven days) batch or semi-continuous or continuous process additional catalyst is generally added continuously or discontinuously during the process. The catalyst that is added may vary during the process. For instance, Raney or other black copper alone may be charged initially and vanadium (as particles of vanadium or Raney vanadium or as Raney copper-vanadium) may then be added alone or with Raney or other black copper when the initial charge becomes less active. Preferably the proportion Cu:V in the reactor is kept substantially constant during the process and since in some processes the black copper tends to be removed from the reactor preferentially, in solution, it is then desirable to reduce the rate at which vanadium is added. Thus sometimes it is unnecessary to add further vanadium after the initial charge, or it is necessary to add vanadium only occasionally, or the proportion of vanadium in the vanadium-copper mixture may be reduced.

Catalyst can be withdrawn from the reactor at any stage and reactivated by being allowed to stand in an aqueous slurry, optionally containing added particulate vanadium, and then reused. Stale catalyst can be withdrawn from the reactor, blended with vanadium, and reused.

The hydrolysis process may be conducted in the absence of any dissolved activator or promoter, for instance as described in U.S. Pat. No. 3,894,084, but it is often preferred to conduct in the presence of dissolved activator or promoter such as nitrate, for instance as described in GB 1,347,160. However another advantage of the invention is that satisfactory conversions and low yields of by-products can be obtained even in the absence of a promoter or activator.

The process can advantageously be conducted in the presence of acetic acid or other reagent to reduce by-products, as described in WO86/00614. The acetic acid can be used as such or as copper acetate.

Before the catalyst system is added to the hydrolysis reaction medium, the Raney copper may be subjected to controlled pre-oxidation, e.g., as described in EP 78178, e.g., by exposing the entire catalyst system to the conditions that will preoxidise Raney copper. The vanadium appears to remain unoxidised.

Reference should be made to the relevant literature, e.g., U.S. Pat. No. 3,894,084, GB 1,347,160, WO86/00614 and EP 78178, for a full description of all relevant details of promoters, proportions of catalyst, nitrile and water and other process conditions, as they can all be conventional.

When R is an unsaturated radical, e.g., an olefinic group, it is necessary to suppress the risk of polymerisation and so the process is preferably conducted in the presence of a polymerisation inhibitor. This can be dissolved monovalent copper formed from cupric salt promoter by dissolution of the black copper. Because of the very high activity of the catalyst, this loss through dissolution may significantly alter the ratio V:Cu in the catalyst and it may be necessary to charge Raney copper alone (or with very little vanadium) in the later stages of the process to prevent an accumulation of vanadium. Alternatively other inhibitor, e.g., hydroquinone may be added instead of relying on cupric ions to cause dissolution of copper.

One preferred process therefore comprises charging the reactor with the vanadium and with Raney copper that has been pre-oxidised to substantially optimum activity (and that may be pre-oxidised Raney copper-vanadium) and using this to hydrolyse a nitrile in the substantial absence of dissolved oxygen or oxidising anions (i.e., in the substantial absence of nitrate). There may be occasional or continuous addition of acetic acid or other material to reduce by-products, as described in WO86/00614. Polymerisation inhibitor, e.g., monovalent copper in the form of a non-oxidising and non-interfering cupric compound or, preferably a non-copper inhibitor, e.g., hydroquinone, para-ethoxyphenol or phenothiazine, may be added when the nitrile is unsaturated, e.g., (meth) acrylonitrile.

Another preferred process comprises charging the reactor with the vanadium and Raney copper (preferably Raney copper-vanadium) and using this to hydrolyse (meth) acrylonitrile or other nitrile in the presence of added copper nitrate or other cupric salt and, when necessary, acetic acid or other suitable material, and replenishing the Raney copper (and optionally the vanadium) at a rate such as to keep the Cu:V ratio in the catalyst substantially constant.

The following are some examples. In these examples the catalysts are one of three types, namely type A, B or C. These are described in more detail in Example 1. The catalysts contain various amounts of added metal and the catalysts are defined by reference to the type of catalyst, the amount of added metal, and the metal that is added. Thus A:1%Ti indicates a type A catalyst containing 1% titanium and B:1%V indicates a type B catalyst with 1% vanadium. In each series of tests, the same Raney copper was used for the blank as for the inventive catalysts. Different Raney coppers were used in different series of tests.

In many of the examples, the performance of a catalyst system was observed by a sealed tube test. In this, the catalyst, deionized water and nitrile were added to a tube which was then sealed and heated to a chosen temperature with agitation in an oil bath for one hour. Unless otherwise stated, the tube was charged with 0.15 g catalyst, 3 g deionised water and 1.6 g acrylonitrile (ACN). At the end of the hour, the tube was cooled, opened and the contents analysed by gas chromatography for acrylamide (ACM), ethylene cyanohydrin (ECNH) and β-hydroxy propionamide (HPA). In some of the tests the reaction mixture was homogeneous (H)

but in others it was heterogeneous, i.e., non-homogeneous (NH). When the reaction mixture was heterogeneous, the analysis was conducted on the aqueous layer.

yield of 45.2% ACM represents essentially total conversion and so the concentration of ACM should be as close to this as possible. The concentrations of ECNH and HPA should be as low as possible. The selectivity of the catalyst can be calculated as $$\frac{\% \text{ ENCH} \times 100}{\% \text{ ACM}}$$

and should be as low as possible.

EXAMPLE 1

Type A

A particulate (<175μm) alloy was prepared by conventional alloy preparation techniques of equal amounts aluminium and copper and sufficient of an added metal to give the desired final content of added metal. The particulate alloy was added gradually to 25% aqueous sodium hydroxide whilst maintaining the solution temperature at about 45° C. When the addition was completed, the mixture was allowed to stand for one hour and the catalyst was then repeatedly washed with deoxygenated deionised water until the pH of the supernatant was constant at about 7. The product was a particulate Raney catalyst substantially free of aluminium and containing copper together with vanadium or other added metal.

Type B

This catalyst was made by mixing particles of 50:50 copper-aluminium alloy with particles of 50:50 vanadium-aluminium alloy and leaching and washing the mixture in the same manner as for the type A catalyst.

Type C

This catalyst was made by making Raney copper by leaching a copper aluminium alloy in the same general manner. A dense slurry of the resultant particulate product was mixed into de-oxygenated water together with the chosen amount of particles of vanadium. These particles were usually below 120μm in size. The quoted weight of vanadium is, for the type C catalyst, based on the slurry and so the amount based on copper would be slightly higher. In example 3 and the second part of Example 11, the vanadium particle size was 50μm and the mixture was tumbled overnight.

EXAMPLE 2

The closed tube test was performed for one hour at 90° C. with the following results.

| Catalyst | % ACM | % ECNH | Selectivity |
|---|---|---|---|
| Raney Cu | 15.7 | .0431 | 0.275 |
| A:1% V | 41.1 | .0220 | 0.054 |
| B:1% V | 32.5 | .0157 | 0.048 |
| C:1% V | 22.5 | .0202 | 0.090 |

This demonstrates that all three types of catalyst according to the invention are very much better, as regards activity and selectivity, than Raney copper but that the greatest improvement is obtained with Raney vanadium (types A or B), especially as a Raney alloy of copper and vanadium (type A).

EXAMPLE 3

The closed tube test was performed for one hour at 130° C. with the following results.

| Catalyst | % ACM | % ECNH | Selectivity |
|---|---|---|---|
| Raney Cu | 23.5 | 0.1967 | 0.839 |
| C:1% V | 44.3 | 0.0623 | 0.196 |
| A:1% V | 45.2 | 0.056 | 0.124 |

This demonstrates the almost total conversion obtainable when using vanadium, compared to the much lower conversion and improved purity in the absence of vandium.

EXAMPLE 4

Catalyst and de-ionised water and acrylonitrile were reacted at 90° C. under pressure over several hours in the sealed tube test and samples were removed at various time intervals and analysed for acrylamide. The results were as follows, for the two catalysts tested.

| Reaction | Raney Cu | | A:1% V | |
|---|---|---|---|---|
| Time (mins) | % ACM | % ECNH | % ACM | ECNH |
| 30 | 8.82 | 0.0074 | 7.6 | 0.0030 |
| 60 | 6.72 | 0.0128 | — | — |
| 90 | — | — | 22.8 | 0.0060 |
| 120 | 10.6 | 0.0230 | 27.5 | 0.0064 |
| 210 | 15.5 | 0.0306 | | |
| 300 | 18.2 | 0.0389 | | |
| 9 hours | 26.1 | 0.0800 | | |

As a result of the inclusion of vanadium, the reaction went to equilibrium very much more quickly and the impurity level was, at all times, much less.

The acrylamide solution resulting from the process using the catalyst containing vanadium was separated from the acrylonitrile (by distillation of the latter) and purified in conventional manner and then used as monomer for polymerisation to produce high molecular weight polyacrylamide. The acrylamide solution was analysed for vanadium ions and none were observed.

EXAMPLE 5

To compare the effect of two processes that are identical except for the difference in solid catalyst, two reactors were used that were equipped for stirring, heating, cooling and separating catalyst and product stream. These were operated in parallel from a single mixed feed vessel. The feed consisted of acrylonitrile and water in the ratio of approximately 40:60 with additions of acetic acid and copper nitrate such that the formation of ECNH and other impurities was minimised and a $Cu^+$ content of 200 to 400 ppm was maintained in the reactor.

Reactor A was charged with Raney copper and the reactor was operated at 120° C. for 18 days, with further addition of Raney copper as necessary, in conventional manner, to maintain the production rate at a chosen level. Throughout this period the ECNH content of the acrylamide was in the range 0.075 to 0.11% based on acrylamide.

Reactor B was charged with A:0.5%V as the catalyst and was operated at 110° C. for 18 days, with further A:0.5%V catalyst being added as necessary during the process to maintain the production rate at a chosen level. Throughout the reaction, the ECNH content was 0.035 to 0.075% based on acrylamide, i.e., substantially below the level of reactor A. Despite the lower temperature in reactor B, the amount of acrylamide produced in B was 14.9% more than the amount produced in A. Despite this increased production, the amount of catalyst used in reactor B was 38% less than the amount used in reactor A.

This process in reactor B can be continued for prolonged periods with satisfactory results but it may be necessary to add Raney copper alone from time to time during the process so as to prevent the proportion of vanadium, based on vanadium plus copper, increasing undesirably.

EXAMPLE 6

21g of A:1%V catalyst was introduced into a reaction flask equipped with a stirrer, thermometer, nitrogen inlet, reflux condenser, facilities for feeding acrylonitrile and water and a means of removing the reaction mix continuously without loss of catalyst. The aqueous suspension of catalyst was heated to 77° C. and the feeding of previously de-oxygenated acrylonitrile and water was begun. The ratio acrylonitrile:water was adjusted to give a homogeneous product when using a retention time of 4.8 hours. The take off rate was adjusted so as to maintain a constant level in the reaction flask. The reaction was run continuously at atmospheric pressure for 106 hours before stopping for 48 hours, after which it was continued for a further 115 hours. The product was analysed regularly by gas chromatography for acrylonitrile, acrylamide and impurity.

As a comparison, a similar atmospheric pressure reaction was carried out using a normal Raney copper catalyst. The reaction used a greater amount (26g) catalyst and was continued for 78 hours. Despite the increase of about 25% in the amount of catalyst, the conversion was less and the impurity level was generally higher.

The extremely good results obtainable at 77° C. and atmospheric pressure demonstrates that the process can be operated commercially economically at atmospheric pressure provided the novel catalyst of the invention is used.

EXAMPLE 7

Acrylamide was made by hydrolysis of acrylonitrile using Raney catalyst in a prolonged conventional commercial process with spent catalyst being withdrawn from the reactor (and replaced by fresh catalyst) when its activity had dropped to an unacceptable level. This spent catalyst was then used as the catalyst in the closed tube test at 120° C. for one hour. Other parts of the spent catalyst were used in the same test after being mixed with, respectively, 0.5%, 1% or 5% particulate vanadium. The following results were obtained.

| Catalyst | % V in Catalyst | % ACM | % ECNH | Selectivity |
| --- | --- | --- | --- | --- |
| Spent Catalyst | 0 | 7.6 | 0.1137 | 1.5 |
| + ~½% V | 0.62 | 9.9 | 0.1050 | 1.1 |
| + ~1% V | 1.45 | 13.9 | 0.0734 | 0.530 |
| + ~5% V | 6.26 | 11.4 | 0.0589 | 0.515 |

This demonstrates that the addition of vanadium to spent catalyst can have a very beneficial effect on its activity and selectivity and so spent catalyst can be restored for use in a commercial process, preferably mixed with fresh Raney copper or Raney copper and vanadium.

EXAMPLE 8

The tube test was repeated using Raney copper and A:1%V catalysts at 90° C. and using acetonitrile. The yield of acetamide using the type A catalyst was approximately double the yield using the conventional Raney copper catalyst.

EXAMPLE 9

The tube test was repeated using Raney copper and A:1%V catalyst and using methacrylonitrile with a temperature of 110° C. for one hour (after which time little conversion had occurred) followed by 130° C. for one hour. The reaction mixture using the Raney copper catalyst was heterogeneous with no insoluble crystals of methacrylamide whereas the reaction mixture using the type A catalyst contained no unconverted layer of acrylonitrile. The aqueous solution crystallised on cooling to give a mass of methacrylamide crystals. The yield of methacrylamide using the type A catalyst was more than double the yield using the Raney copper catalyst.

EXAMPLE 10

The tube test of example 2 using the same Raney copper was repeated using A:5%V. The values of %ACM, % ECNH and selectivity were, respectively, 23.8, 0.0433 and 0.182, demonstrating that yield and selectivity are better than with Raney copper but that better results in A type catalyst are obtained at about 1%V than at 5%V.

EXAMPLE 11

The closed tube test was performed at 90° C for one hour using various type C catalysts in two series of experiments, as follows.

| Catalyst | % ACM | % ECNH | Selectivity |
| --- | --- | --- | --- |
| Raney Cu | 13.4 | .0461 | .345 |
| C:0.1% V | 13.9 | .0409 | .294 |
| C:0.5% V | 15.0 | .0371 | .251 |
| C:1% V | 19.0 | .0346 | .182 |
| C:5% V | 24.0 | .0141 | .058 |
| C:10% V | 10.5 | .1078 | 1.027 |
| V Powder | 0.3 | — | — |
| Raney Cu | 13.6 | 0.0533 | 0.392 |
| C:5.7% V | 16.5 | 0.0116 | 0.070 |
| C:10.6% V | 13.3 | 0.0109 | 0.082 |
| C:20.8% V | 6.5 | 0.0104 | 0.160 |
| C:36.8% V | 3.6 | 0.0130 | 0.361 |
| C:62.5% V | 1.9 | 0.0067 | 0.353 |
| C:78.6% V | 0.7 | 0.0035 | 0.500 |

The result quoted above for 10% V appears anomolous. These results clearly establish the desirability, for type C catalysts, of using around 5% vanadium and demonstrate the desirability of keeping the total amount of vanadium below about 10%.

EXAMPLE 12

The closed tube test was conducted at 90° C. for one hour using various type C catalysts containing various metals.

| Catalyst | % ACM | % ECNH | Selectivity |
| --- | --- | --- | --- |
| Raney Cu | 14.0 | 0.0405 | 0.289 |
| C:1% V | 17.6 | 0.0395 | 0.224 |

| Catalyst | % ACM | % ECNH | Selectivity |
|---|---|---|---|
| C:1% Mn | 11.1 | 0.0490 | 0.441 |
| C:1% Fe | 13.1 | 0.0517 | 0.394 |
| C:1% W | 13.7 | 0.0475 | 0.348 |
| C:1% Zn | 13.0 | 0.0776 | 0.596 |
| C:1% Se | 13.4 | 0.0483 | 0.359 |
| C:1% Nb | 14.1 | — | — |
| A:1% V | 24.3 | 0.014 | 0.059 |

When this example was repeated using, instead of the 1% metal additions quoted above, 5% silver, niobium, nickel, titanium or molybdenum, the yield of acrylamide was always below 14%.

This clearly demonstrates the criticality of using metalic vanadium in type C catalysts in preference to any of the other metals.

EXAMPLE 13

The closed tube test was conducted for one hour at various temperatures with various type A catalysts using various metals. In test 15 the amount of catalyst was 0.075 g, half the normal amount. The results are as follows.

| Test | Temp. | Catalyst | Mixture | % ACM | % ECNH | % HPA | Selectivity |
|---|---|---|---|---|---|---|---|
| 1 | 130° C. | Raney Cu | H | 35.8 | 0.138 | 0.225 | 0.385 |
| 2 | 130° C. | A:1% Ti | H | 35.4 | 0.076 | 0.305 | 0.215 |
| 3 | 130° C. | A:1% V | H | 45.2 | 0.056 | 0.460 | 0.124 |
| 4 | 130° C. | A:1% Mo | H | 33.9 | 0.043 | 0.025 | 0.127 |
| 5 | 130° C. | A:1% Cr | — | 17.3 | 0.156 | — | 0.895 |
| 6 | 130° C. | A:1% Fe | — | 27.9 | 0.073 | — | 0.262 |
| 7 | 130° C. | A:1% Co | — | 22.4 | 0.096 | — | 0.429 |
| 8 | 130° C. | A:1% Ni | — | 28.6 | 0.096 | — | 0.338 |
| 9 | 110° C. | Raney Cu | NH | 17.0 | 0.098 | 0.018 | 0.576 |
| 10 | 110° C. | A:1% Ti | NH | 22.1 | 0.055 | 0.016 | 0.249 |
| 11 | 110° C. | A:1% V | H | 40.3 | 0.015 | 0.016 | 0.037 |
| 12 | 110° C. | A:1% Mo | NH | 20.6 | 0.017 | — | 0.083 |
| 13 | 100° C. | Raney Cu | NH | 13.1 | 0.089 | 0.014 | 0.679 |
| 14 | 100° C. | A:1% V | H | 37.8 | 0.012 | 0.009 | 0.032 |
| 15 | 100° C. | A:1% V(½) | H | 26.9 | 0.023 | 0.006 | 0.086 |

This clearly demonstrates the improved yield and selectivity obtained using vanadium in type A catalysts compared to the other metals.

EXAMPLE 14

A closed tube test was conducted at 120° C. for one hour using Raney copper as the catalyst and with various amounts of vanadyl nitrate dissolved in the aqueous medium. The amounts used ranged between 100 and 10,000 ppm based on copper (0.01 to 1%) with the following results. As a comparison, a type C:1.5%V catalyst was used with no soluble vanadium in the aqueous phase. The results were as follows.

| Soluble V (ppm) | % ACM | % ECNH |
|---|---|---|
| 0 | 31.5 | 0.0488 |
| 100 | 28.1 | 0.1008 |
| 500 | 28.8 | 0.2772 |
| 2000 | 46.1 | 0.1842 |
| 5000 | 26.8 | 0.2055 |
| 10000 | 2.4 | 0.3790 |
| C:1.5% V | 39.2 | 0.0396 |

Although these results demonstrate an improved yield of acrylamide at one particular concentration of soluble vanadium compound (this possibly being consistent with the interest in the prior art on the use of vanadyl compounds in copper catalysts), it will be observed that this increased yield of acrylamide occurred at only one concentration and was accompanied by a greatly increased yield of impurity and so the process would be commercially unsatisfactory. The process of the invention, using a type C catalyst, gave a yield of acrylamide that was almost as good but with a very much lower impurity level.

EXAMPLE 15

The closed tube test at 90° C. for one hour was conducted using Raney copper or other catalysts, follows.

Catalysts D and E were made as described in Japanese patent 56/20308 by reaction of copper chloride, sodium hydroxide, formaldehyde and, respectively, ammonium vanadate or vanadium pentoxide.

Catalyst F was made as described in BR 8305831 by reaction of copper sulphate, sodium hydroxide, vanadium peroxide and hydroxylamine hydrochloride.

Catalyst G was made by reaction of copper sulphate, sodium hydroxide and hydrazine sulphate in the presence of metallic vanadium powder.

| Catalyst | % ACM | % ECNH | Selectivity |
|---|---|---|---|
| Raney Cu | 14.88 | 0.036 | 0.24 |
| D | 6.03 | 0.065 | 1.08 |
| E | 5.79 | 0.055 | 0.95 |
| F | 0.26 | 0.058 | 22.31 |
| G | 7.06 | 0.012 | 0.17 |

The result for F appears anomolous. Results similar to those for D or E appear more probable.

Comparison of D to G with the Raney copper result and with the data in the other examples comparing Raney copper with Raney copper plus vanadium metal clearly shows the particular benefits from the use of Raney copper with vanadium metal and from the use of vanadium metal in place of compounds of vanadium.

We claim:

1. In the process of making an amide of the formula $RCONH_2$ where R is an olefinic hydrocarbon group of 2 to 10 carbon atoms by hydrolysis at 20° to 150° C. of the corresponding nitrile RCN in an aqueous medium containing a metal catalyst consisting essentially of black copper metal, the improvement which comprises the metal catalyst also containing vanadium metal in an amount of 0.01 to 10% by weight based on the combined weight of black copper and vanadium and the process being conducted in the substantial absence of dissolved vanadium.

2. A process according to claim 1 in which the black copper is Raney copper.

3. A process according to claim 1 in which the catalyst consists essentially of 99.9 to 90% Raney copper and 0.1 to 10% vanadium as an alloy with copper in Raney copper, as Raney vanadium or as particulate, non-microporous, vanadium.

4. A process according to claim 1 in which the copper is present as Raney copper and the vanadium is present as Raney vanadium or as a Raney alloy of copper and vanadium.

5. A process according to claim 1 in which the metal catalyst comprises 98 to 99.7% Raney copper and 2 to 0.3% vanadium present as an alloy with copper of the Raney copper.

6. A process according to claim 1 in which the black copper is Raney copper and cupric salt is incorporated in the aqueous medium and in which the Raney copper is charged to the aqueous medium initially and continuously or discontinuously during the process and in which vanadium metal is charged to the aqueous medium initially at an initial rate, relative to the initial amount of copper, and is subsequently charged at a decreased rate relative to the amount of copper that is being subsequently charged.

7. A process according to claim 1 in which the catalyst is formed by mixing vanadium metal with exhausted Raney copper catalyst collected from a previous process.

8. A process according to claim 1 in which the nitrile is (meth) acrylonitrile and the amide is (meth) acrylamide.

9. A process according to claim 1 conducted at a temperature of about 70° to 95° C. under atmospheric pressure.

10. A process according to claim 1 in which the catalyst consists essentially of 99.9 to 90% Raney copper and 0.1 to 10% vanadium in a form selected from the group consisting of an alloy with copper in Raney copper Raney vanadium and particulate, non-microporous, vanadium, and in which the nitrile is (meth) acrylonitrile and the amide is (meth) acrylamide, and in which the process is a prolonged process and the aqueous medium is at a temperature of 70° to 130° C. and during the process cupric nitrate and Raney copper are added to the aqueous medium.

11. A process according to claim 1 in which acetic acid is included in the aqueous medium.

12. A process according to claim 10 in which acetic acid is included in the aqueous medium.

13. A process according to claim 10 in which the black copper is Raney copper and cupric salt is incorporated in the aqueous medium and in which the Raney copper is charged to the aqueous medium initially and continuously or discontinuously during the process and in which vanadium metal is charged to the aqueous medium initially at an initial rate, relative to the initial amount of copper, and is subsequently charged at a decreased rate relative to the amount of copper that is being subsequently charged.

* * * * *